(12) United States Patent
Mohamadi

(10) Patent No.: US 9,329,001 B2
(45) Date of Patent: *May 3, 2016

(54) REMOTE DETECTION, CONFIRMATION AND DETONATION OF BURIED IMPROVISED EXPLOSIVE DEVICES

(71) Applicant: Farrok Mohamadi, Irvine, CA (US)

(72) Inventor: Farrok Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/656,382

(22) Filed: Oct. 19, 2012

(65) Prior Publication Data

US 2014/0062754 A1 Mar. 6, 2014

Related U.S. Application Data

(60) Provisional application No. 61/551,769, filed on Oct. 26, 2011.

(51) Int. Cl.

| F41H 11/136 | (2011.01) |
| B64C 19/00 | (2006.01) |
| B64D 47/08 | (2006.01) |
| F41H 11/13 | (2011.01) |
| F41H 11/16 | (2011.01) |

(52) U.S. Cl.
CPC ............. *F41H 11/136* (2013.01); *B64C 19/00* (2013.01); *B64D 47/08* (2013.01); *F41H 11/13* (2013.01); *F41H 11/16* (2013.01); *B64C 2201/027* (2013.01); *B64C 2201/123* (2013.01); *B64C 2201/145* (2013.01)

(58) Field of Classification Search
CPC ............................ G01S 13/9035; G01S 13/867
USPC .................................... 342/25 F, 61, 63
See application file for complete search history.

(56) References Cited

U.S. PATENT DOCUMENTS

| 3,952,299 A | * | 4/1976 | Hodge et al. | .................. 342/64 |
| 4,160,974 A | * | 7/1979 | Stavis | ............................ 342/63 |
| 4,818,990 A | * | 4/1989 | Fernandes | ................ 340/870.07 |

(Continued)

OTHER PUBLICATIONS

Michael E. Eyler, "Polarimetric Imaging for the Detection of Disturbed Surfaces", Naval Postgraduate School Monterey, California Jun. 2009.*

(Continued)

*Primary Examiner* — John R Olszewski
*Assistant Examiner* — James M McPherson
(74) *Attorney, Agent, or Firm* — Haynes and Boone, LLP

(57) ABSTRACT

A small unmanned aerial system (sUAS) is used for remotely detecting concealed explosive devices—such as buried or otherwise hidden improvised explosive devices (IED)—and exploding or disarming the device while an operator of the sUAS, or other personnel, remain at a safe distance. The sUAS system can be operated at an extended, e.g., greater than 100 meters, standoff from the detection apparatus, explosive, and potential harm and may be operated by a single member of an explosive ordnance disposal (EOD) team. The sUAS may be implemented as an easy-to-operate, small vertical take-off and landing (VTOL) aircraft with a set of optical, thermal, and chemical detection modules for detecting an IED by aerial surveillance, confirming the existence of explosives, and providing options for detonating the IED electrically or by delivery of a payload (e.g., object or device) to neutralize the IED while maintaining the sUAS itself safe from harm.

18 Claims, 12 Drawing Sheets

(56) References Cited

U.S. PATENT DOCUMENTS

| | | | | |
|---|---|---|---|---|
| 4,965,582 A * | 10/1990 | Hellsten | 342/25 A |
| 4,990,925 A * | 2/1991 | Edelsohn et al. | 342/424 |
| 5,225,838 A * | 7/1993 | Kanter et al. | 342/61 |
| 5,487,172 A * | 1/1996 | Hyatt | 712/32 |
| 5,886,662 A * | 3/1999 | Johnson | 342/25 A |
| 6,023,061 A * | 2/2000 | Bodkin | 250/332 |
| 6,112,141 A * | 8/2000 | Briffe et al. | 701/14 |
| 6,384,766 B1 * | 5/2002 | Ulander | 342/25 R |
| 6,405,134 B1 * | 6/2002 | Smith et al. | 702/4 |
| 6,567,044 B2 * | 5/2003 | Carroll | 342/357.34 |
| 6,646,593 B1 * | 11/2003 | Garren | G01S 13/9035 342/159 |
| 6,653,970 B1 * | 11/2003 | Mitra | 342/22 |
| 6,727,841 B1 * | 4/2004 | Mitra | 342/25 R |
| 6,867,727 B1 * | 3/2005 | Mitra | 342/59 |
| 7,312,763 B2 | 12/2007 | Mohamadi | |
| 7,478,817 B1 * | 1/2009 | Carrier | 180/6.48 |
| 7,504,984 B1 * | 3/2009 | Mitra | 342/22 |
| 7,511,654 B1 * | 3/2009 | Goldman | G01S 13/885 342/179 |
| 7,548,205 B2 | 6/2009 | Mohamadi | |
| 7,720,630 B1 * | 5/2010 | Miller et al. | 702/150 |
| 7,741,990 B2 * | 6/2010 | Aprile | 342/25 B |
| 7,830,989 B2 | 11/2010 | Mohamadi | |
| 7,884,757 B2 | 2/2011 | Mohamadi et al. | |
| 7,924,210 B2 * | 4/2011 | Johnson | 342/25 A |
| 8,138,961 B2 * | 3/2012 | Deshpande | 342/25 F |
| 8,237,604 B2 | 8/2012 | Mohamadi et al. | |
| 8,744,760 B1 * | 6/2014 | Mishmash et al. | 701/454 |
| 2004/0075018 A1 * | 4/2004 | Yamane | 244/17.13 |
| 2005/0139363 A1 * | 6/2005 | Thomas | 169/30 |
| 2007/0252748 A1 * | 11/2007 | Rees et al. | 342/29 |
| 2008/0055149 A1 * | 3/2008 | Rees et al. | 342/29 |
| 2008/0091520 A1 * | 4/2008 | Hatori et al. | 705/11 |
| 2008/0117098 A1 * | 5/2008 | Johnson et al. | 342/25 F |
| 2008/0169962 A1 * | 7/2008 | Rees et al. | 342/29 |
| 2008/0191924 A1 * | 8/2008 | Duff et al. | 342/14 |
| 2009/0243855 A1 * | 10/2009 | Prokopuk | 340/572.1 |
| 2010/0275472 A1 * | 11/2010 | Cunningham | 37/403 |
| 2011/0015810 A1 * | 1/2011 | Lee | 701/16 |
| 2011/0068224 A1 * | 3/2011 | Kang et al. | 244/116 |
| 2011/0133089 A1 * | 6/2011 | Tolton et al. | 250/338.5 |
| 2011/0210883 A1 * | 9/2011 | Mohamadi | 342/21 |
| 2011/0221692 A1 * | 9/2011 | Seydoux | A63H 27/12 345/173 |
| 2011/0285981 A1 * | 11/2011 | Justice et al. | 356/4.01 |
| 2012/0003746 A1 * | 1/2012 | Amisar | 436/110 |
| 2012/0078451 A1 * | 3/2012 | Ohtomo et al. | 701/15 |
| 2012/0088036 A1 * | 4/2012 | Greenhill et al. | 427/532 |
| 2012/0105274 A1 * | 5/2012 | Andersson et al. | 342/25 A |
| 2012/0112957 A1 * | 5/2012 | Nguyen et al. | 342/25 A |
| 2012/0135537 A1 * | 5/2012 | Horton et al. | 436/172 |
| 2012/0177027 A1 * | 7/2012 | Venkatraman et al. | 370/350 |
| 2012/0185129 A1 * | 7/2012 | Carrier | 701/36 |
| 2012/0206293 A1 * | 8/2012 | Nguyen | G01S 7/414 342/25 F |
| 2012/0215388 A1 * | 8/2012 | Pepitone et al. | 701/14 |
| 2012/0234968 A1 * | 9/2012 | Smith | 244/12.3 |
| 2012/0282705 A1 * | 11/2012 | Lei et al. | 436/110 |
| 2012/0325024 A1 * | 12/2012 | Vidal-de-Miguel et al. | 73/863.24 |
| 2013/0237826 A1 * | 9/2013 | Levien | 600/448 |
| 2013/0248656 A1 * | 9/2013 | Mohamadi | 244/190 |
| 2013/0255574 A1 * | 10/2013 | Cunningham | 118/712 |
| 2014/0062754 A1 * | 3/2014 | Mohamadi | 342/22 |
| 2014/0062758 A1 * | 3/2014 | Mohamadi | 342/53 |
| 2014/0125511 A1 * | 5/2014 | Longstaff | 342/33 |
| 2014/0127824 A1 * | 5/2014 | Amisar | 436/107 |
| 2014/0140796 A1 * | 5/2014 | Cunningham | 414/467 |
| 2014/0168010 A1 * | 6/2014 | Mohamadi | 342/357.39 |

OTHER PUBLICATIONS

Fred Mohamadi, "Wafer-scale integration brings low cost and a small footprint to active antenna arrays", Microwave/Millimeter Wave Technology, rfdesign.com, Feb. 2005.*

Douglas Murphy and James Cycon, "Applications for mini VTOL UAV for law enforcement", Space and Naval Warfare Systems Center San Diego, CA 92152-7383, Nov. 1998.*

John E. McFee, Major Al Carruthers, "A multisensor mine detector for peacekeeping—Improved Landmine Detector Concept (ILDC)", Proc. SPIE 2765, Detection and Remediation Technologies for Mines and Minelike Targets,233 (May 31, 1996); doi:10.1117/12.241226.*

* cited by examiner

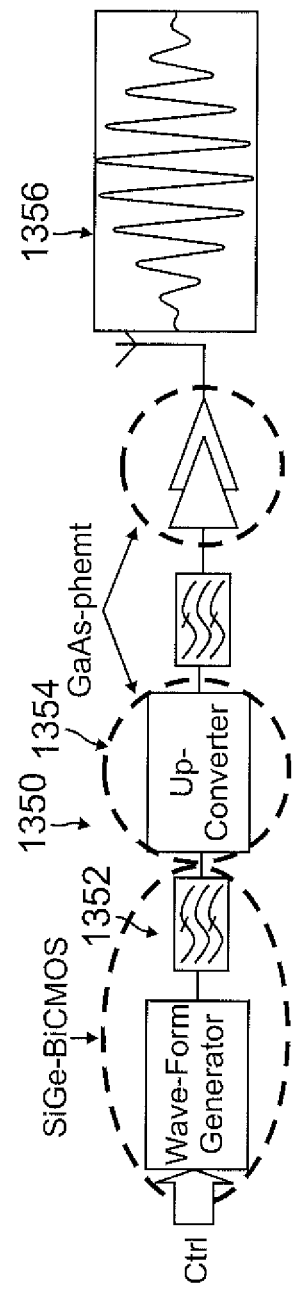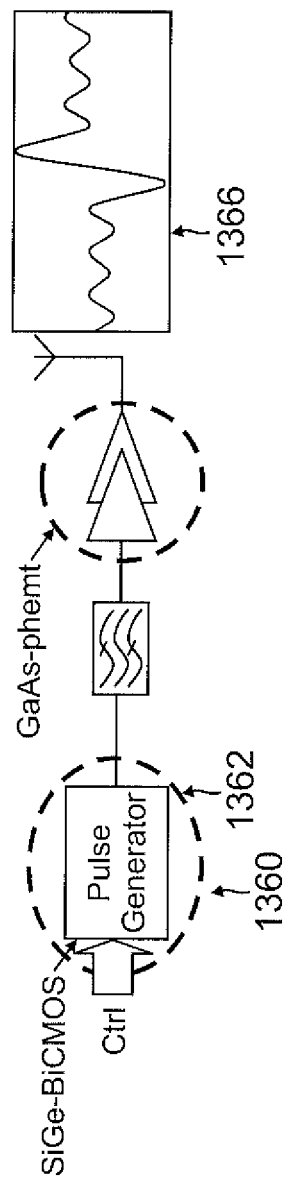
FIG. 2A
FIG. 2B

REMOTE DETECTION, CONFIRMATION AND DETONATION OF BURIED IMPROVISED EXPLOSIVE DEVICES

CROSS REFERENCE TO RELATED APPLICATIONS

This application claims the benefit of priority from U.S. Provisional Patent Application No. 61/551,769, filed Oct. 26, 2011, which is incorporated by reference.

BACKGROUND

Embodiments of the present invention generally relate to unmanned aerial surveillance and, more particularly, to a small unmanned aerial system (sUAS) using a combination of radio, optical, thermal, and chemical detection for confirming the existence of explosives and providing for their detonation from a safe distance.

There is often a need for detection of hidden objects, e.g., objects such as weapons or explosives hidden behind a wall of a building, concealed on individuals, or otherwise buried or concealed. Such needs often arise in situations where surveillance or security protection is desired—such as for police work, military combat scenarios, or fire and rescue situations.

It may be desirable, for example, to be able to detect objects such as weapons or bombs hidden behind a wall of a building or buried underground. Solutions to such problems may be useful in situations where surveillance of an inhabitable area from behind a building wall may be desired, for example, for detecting illegal activities such as smuggling or illegal border crossings or, for example, detecting the presence of hostile individuals in a war zone or terrorist situation. Another important application is detection of unexploded ordnance (UXO) such as abandoned landmines or undetonated bombs that may, for example, be left over from past conflicts. In urban environments, unexploded ordnance often may lie concealed behind standing walls.

An important case of detecting concealed objects, particularly in tactical situations—such as encountered in a war zone or against terrorist activities—is the detection of improvised explosive devices (IED). IEDs (and landmines) may generally lie concealed underground and may urgently require investigation of narrow roads, river beds, culverts, and tactical choke points, for example. Many such situations, however, can expose the operator of detection equipment to grave danger and unacceptably high risks. Equipment used for exploding or otherwise disarming explosive devices and ordnance may expose the equipment to explosion and loss of the equipment.

BRIEF DESCRIPTION OF THE DRAWINGS

FIGS. 2A and 2B are system block diagrams illustrating alternative implementations of radar transmitters for the sensor of FIG. 1, in accordance with one or more embodiments.

Figure 1:
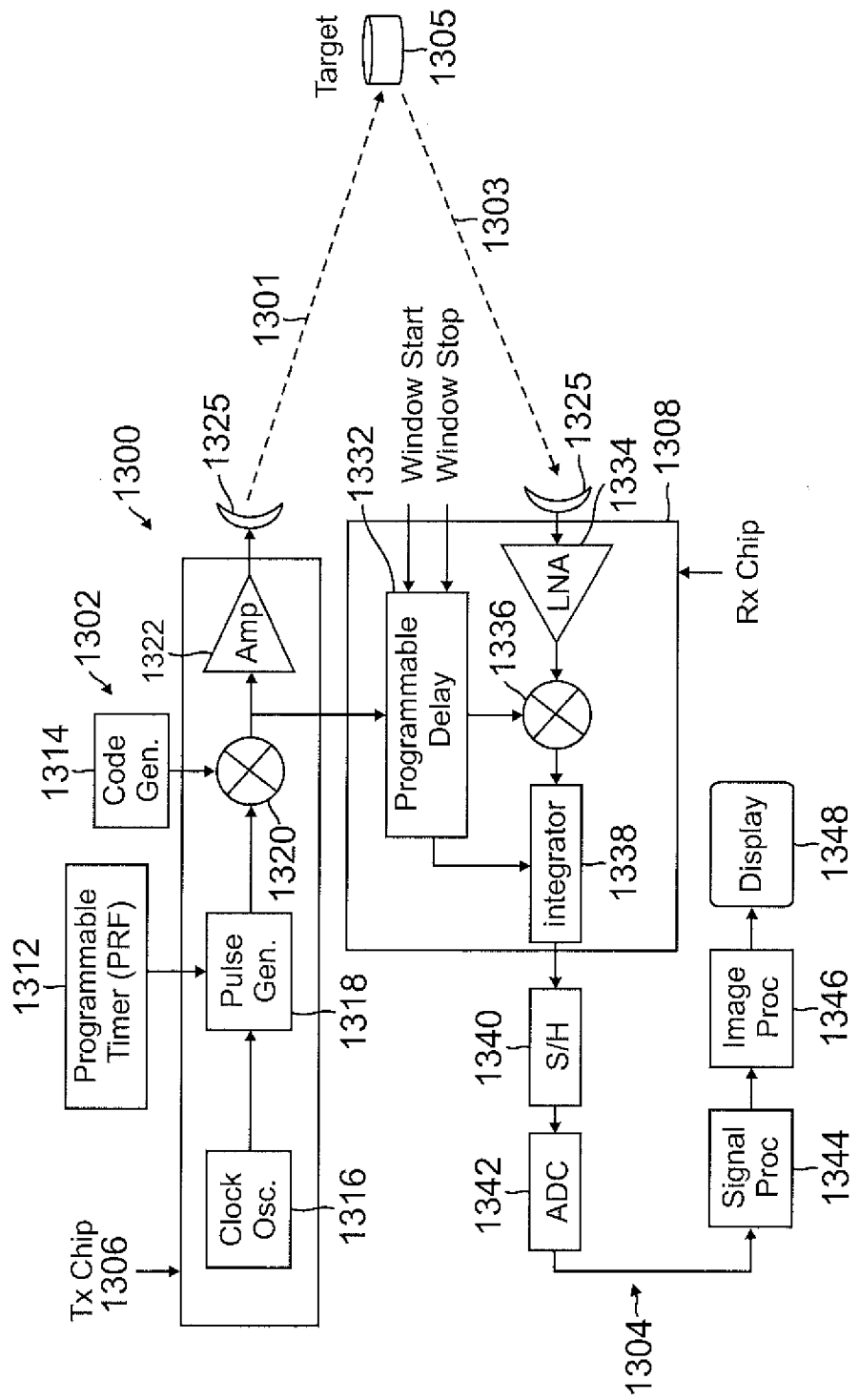
FIG. 1 is a system block diagram illustrating a radar sensor in accordance with an embodiment of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for remotely detecting concealed explosive devices—such as buried or otherwise hidden improvised explosive devices (IED), for example—and identifying the exact location of a concealed explosive device so that the device can be exploded or otherwise disarmed while an operator of the detection equipment, or other personnel, remain at a safe distance from the explosive device. One or more embodiments may fulfill the need for an advanced IED detection, verification, and neutralization system with capability to be operated at an extended, e.g., greater than 100 meters (m), standoff (distance of a human operator from the detection apparatus and potential harm). Furthermore, the system capability may be suitable for operation at a safe distance (e.g., greater than 100 m) by a single member of an explosive ordnance disposal (EOD) team. One or more embodiments may be implemented as an easy-to-operate, small unmanned aerial system (sUAS) with a set of optical, thermal, and chemical detection modules for detecting an IED by aerial surveillance, confirming the existence of explosives, and providing options of detonating the IED electrically or by delivery of a payload (e.g., object or device) to neutralize the IED while maintaining the sUAS itself safe from explosion.

In one or more embodiments, a remotely controlled small unmanned aerial system (sUAS)—with vertical take-off and landing (VTOL) capability and capability to hover at a near standstill—may be used to address investigation of tactically significant choke points such as narrow roads, river beds, and culverts and may be used at any time of day to help minimize operating costs of the system. Operational capabilities of one or more embodiments may include: streaming of optical and thermal of "entropy" (also referred to as "texture") processed images from a scanned area; scanning using Differential Global Positioning System (DGPS) and multiple waypoint programming for fine grid spatial scanning of the ground at a constant altitude; scanning, using ultra wideband (UWB) radar, of a suspect area of approximately 15 feet (ft.) by 15 ft. with 0.5 ft. resolution within 10 minutes; landing a chemical sniffer module to sniff for verification of presence of explosive; image construction for resolution of targets (e.g., IEDs) as small as or smaller than 0.5 ft.; remotely detonating an IED using a high voltage electrical impulse or delivery of a payload from a safe distance; and anti jamming capability for remote operation of the sUAS.

One or more embodiments provide methods and systems for unmanned aerial surveillance using a combination of radio, optical, thermal, and chemical detection using a small unmanned aerial system (sUAS) and additionally provide for confirming the existence of explosives and accomplishing their detonation from a safe distance. For example, in one embodiment a system may include: an aircraft having a plurality of wing unit propellers for vertical takeoff and landing; a control system included in the aircraft for controlling flight of the aircraft from a remote location; an ultra-wideband (UWB) radar imaging system, carried by the aircraft, for detecting the presence of buried objects; and a telemetry system carried by the aircraft for providing information from the UWB radar imaging system to the remote location, in which the system is configured to perform an autonomous scan of a suspect area by autonomously flying the aircraft in a search pattern over the suspect area and interrogating the suspect area with the UWB radar imaging system.

FIG. 1 illustrates a radar sensor 1300 in accordance with an embodiment of the present invention. Radar sensor 1300 may include an impulse radar transmitter 1302 that transmits narrow radio frequency (RF) pulses at a certain pulse repetition frequency (PRF). For example, the transmitter of radar sensor 1300 may emit RF radiation 1301 in the form of rapid wideband (narrow width) radar pulses at a chosen pulse repetition frequency (PRF) in the 1-10 GHz band. The pulses can penetrate, for example, soil, glass, wood, concrete, dry wall, and bricks with varying attenuation constant. By choosing a PRF in the range of 10-100 MHz, for example, and appropriate average transmitter power, a surveillance range of approximately 5-50 feet can generally be achieved. The radar system 1300 may, for example, transmit Gaussian pulses as short as 100 pico-seconds wide with center frequency in the 1-10 GHz band. Transmitter 302 may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference.

Radar sensor 1300 may include a radar receiver 1304 that performs the required signal processing on a reflected response (e.g., reflected pulses 1303) to construct a digitized representation of the target 1305 (e.g., a buried IED). In the receiver 1304, amplitude and delay information may be extracted and digitally processed. As shown in FIG. 1, many of the transmitter 1302 functions may be implemented on a transmitter chip 1306 and many of the receiver 1304 functions may be implemented on a receiver chip 1308.

A general block diagram of transmit and receive functions are depicted in FIG. 1. As shown in FIG. 1, radar sensor 1300 may include modules for performing the functions, including: programmable timer 1312 for establishing the PRF; code generator 1314 for providing modulations to the signal 1301; clock oscillator 1316 for providing the RF carrier frequency signal; pulse generator 1318 for forming (or generating) narrow radar pulses based on timing from programmable timer 1312; multiplier 1320 for combining the generated radar pulses with the output of code generator 1314; power amplifier 1322 for amplifying the pulse signal and feeding it to antenna 1325, which may a wafer scale, beam forming antenna as described above. Although two antennas 1325 are shown in FIG. 1 for clarity of illustration, use of a circulator (not shown) may enable use of a single antenna 1325 for both transmit and receive. Antenna 1325 may include an active array antenna implemented using wafer scale antenna module technology. Wafer scale antenna modules (WSAM) are disclosed by U.S. Pat. No. 7,884,757, issued Feb. 8, 2011, to Mohamadi et al. and U.S. Pat. No. 7,830,989, issued Nov. 9, 2010 to Mohamadi, both of which are incorporated by reference.

Radar sensor 1300, as shown in FIG. 1, may further include modules for performing functions, including: programmable delay timer 1332, coordinated with the transmitted signal 1301, as indicated by the arrow between transmitter chip 1306 and receiver chip 1308, for providing timing, e.g., window start and window stop, for receiving reflected pulses 1303; a low noise amplifier 1334 for receiving the reflected pulses 1303; multiplier 1336 for combining the received reflected pulses 1303 and the window delay from programmable delay timer 1332; integrator 1338; sample and hold 1340, analog to digital converter 1342; signal processor 1344 (e.g., a digital signal processor or DSP); image processor 1346; and display 1348. Display 1348 may be as shown for example in FIG. 7B or FIGS. 10A, 10B.

FIGS. 2A and 2B illustrate alternative implementations of radar transmitters (e.g., radar transmitter 1302) for radar sensor 1300 of FIG. 1, in accordance with one or more embodiments. In one implementation strategy, shown in FIG. 2A, the pulse shaping 1352 is performed in the intermediate frequency (IF) bands, and the resulting pulse is up-converted 1354 to RF frequencies resulting in a "carrier-inclusive" UWB-pulse or burst 1356. This strategy may provide versatility in defining carrier frequency for transmission with more flexibility in wave-pulse form definition.

In another implementation strategy, shown in FIG. 2B, the pulse generation 1362 is performed in the RF bands resulting in a "carrier-less" UWB-pulse 1366. This strategy may use less complex circuitry and may have lower power dissipation.

As indicated in FIGS. 2A and 2B, either implementation may employ indium phosphid high electron mobility transistor (HEMT), silicon complementary metal oxide semiconductor (CMOS) or silicon-germanium (SiGe) bipolar-complementary metal oxide semiconductor (BiCMOS) technologies. Also as indicated in FIGS. 2A and 2B, the up-converter and power amplifier stages of either implementation may employ gallium-arsenide (GaAs) pseudomorphic high electron mobility transistor (pHEMT) technologies.

Figure 3:
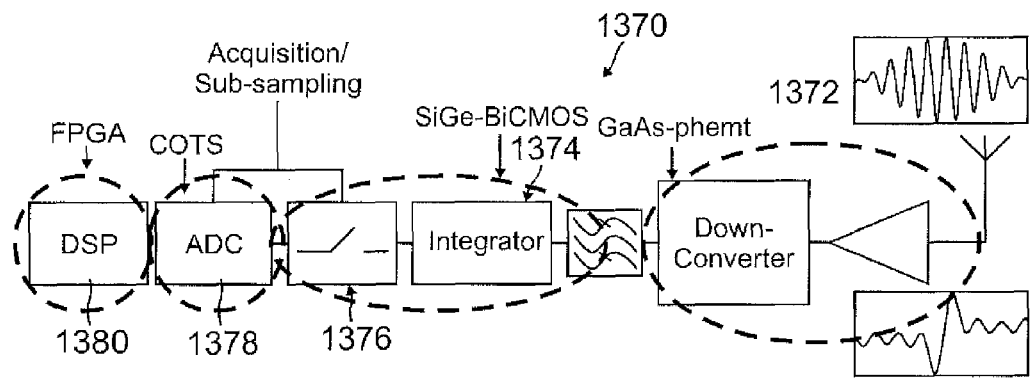
FIG. 3 is a system block diagram illustrating a radar receiver for the sensor of FIG. 1, in accordance with an embodiment.

FIG. 3 illustrates a radar receiver front-end 1370 for the radar sensor 1300 of FIG. 1, in accordance with an embodiment. Either type (as shown in FIG. 2A or 2B) of the transmitted pulse 1356 or 1366 may be received by the radar receiver front-end 1370. The amplified (and down-converted 1372) received signal is integrated 1374 to increase the signal to noise ratio (SNR). A sub-sampling track and hold circuit 1376 is used to create the "base-band" or "low-IF" signal. An analog to digital convertor (ADC) 1378 creates the digital representation of the base-band signal and forwards the data streams to digital signal processing (DSP). Due to the wide-band character of the analog RF signals, the filters as well as the custom made high frequency circuits of the receiver may be designed with constant group-delay.

As indicated in FIG. 3, the ADC 1378 may be implemented from commercially available components, also referred to as commercial-off-the-shelf (COTS) and the DSP 1380 may be implemented using field programmable gate array (FPGA) technology. As indicated in FIG. 3, implementation of radar receiver front-end 1370 may also employ, as with the implementation of the radar sensor 1300 transmitter, silicon-germanium SiGe BiCMOS technologies and GaAs pHEMT technologies.

Figure 4:
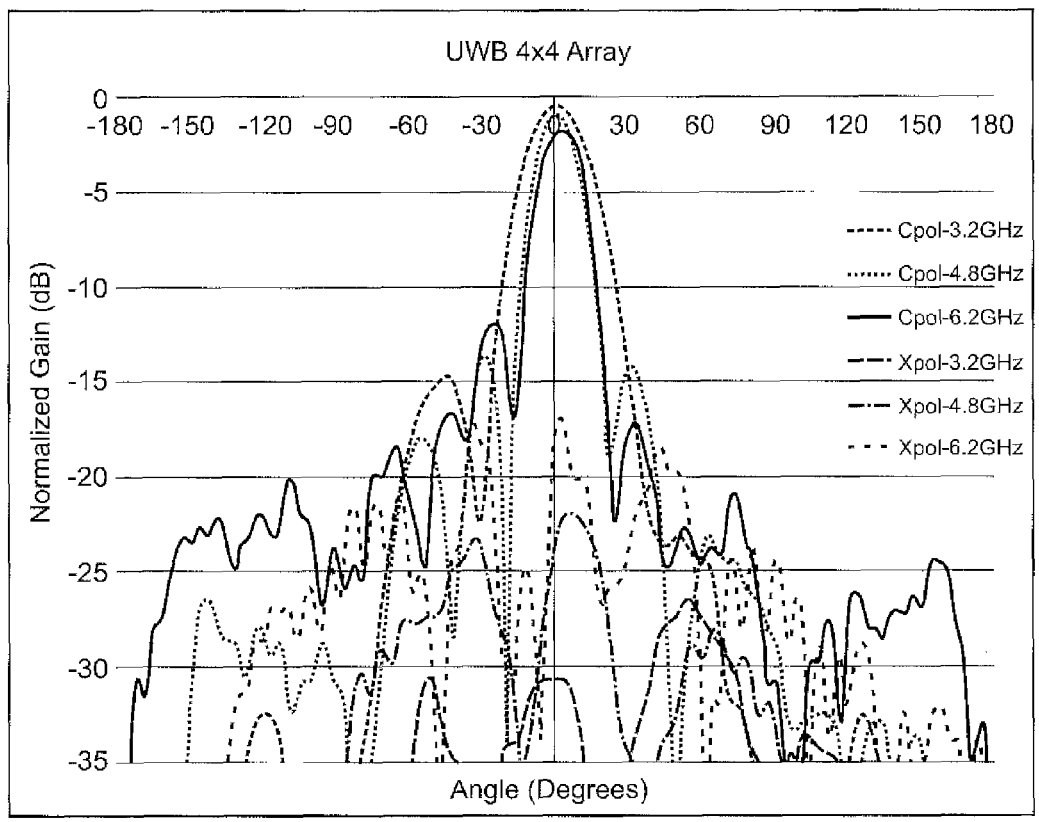
FIG. 4 is a graph illustrating a field pattern and beam width characteristics for an antenna array for the sensor of FIG. 1, in accordance with an embodiment.

FIG. 4 illustrates a field pattern and beam width characteristics for an antenna array for the radar sensor 1300 of FIGS. 1-3, in accordance with an embodiment. FIG. 4 demonstrates, for example, a field pattern and beam width characteristics of a 4×4 antenna array used in a UWB radar for radar sensor 1300. The beam width of the transmitter/receiver (Tx/Rx) is shown in FIG. 4 to be about 30 degrees at 3.2 GHz and 22 degrees at 6.2 GHz with a 2 dB loss compared to the 3.2 GHz beam. There is no cross polarization from the array illustrated by FIG. 4.

Equation 1 describes the relationship between the transmitter power of sensor 1300, target distance, target cross section, and receiver sensitivity of sensor 1300. To calculate the reflected signal strength, it has been assumed that the effective reflective signal from ground is due to the effective cross section of the antenna beam at that elevation.

Equation (1)

$$SNR = \frac{E_S}{E_N} = \frac{P_S \tau_P}{kT_0 F_n} = \frac{P_T G_T G_R \lambda^2 \sigma}{(4\pi)^3 R^4 kT_0 F_n L} \tau_P \text{ joule/joule or} \tag{1}$$

$$\frac{w-s}{w-s} \text{ or } \frac{w}{w}$$

where:
$P_T$=Transmit Power
$G_T$=Tx Antenna Gain
$G_R$=Rx Antenna Gain
$\lambda$=Wavelength
$\sigma$=Effective Cross Section
$\tau_p$=Period
B=Bandwidth
R=Antenna Distance to Target
$kT_0$=Noise Power
$F_n$=Noise Factor
L=Radar Loss
$f_c$=Frequency
And, Equation (2):

$$\lambda = c/f_c \tag{2}$$

Equation (3):

$$B = 1/\tau_p \tag{3}$$

Equation (4):

$$L = L_t L_r L_{other} \tag{4}$$

The cross section is then derived from the beam width ($\beta$) using Equation (5).

Equation (5):

$$\sigma = \pi^*(R^*\text{Tan}(\beta/2))^2 \tag{5}$$

Equation 6 defines a modified SNR Radar Imaging Function of Equation (1) in each grid location (see FIGS. 11A-11D) with reflected power delay to radar indicating the depth information. For simplicity UWB wave travelling time in ground has been assumed to be half of that in air. Additionally, the SNR has been averaged over 4 nearest neighboring cells that received reflected power.

Equation (6)

$$SNR = \sum_{i=1}^{m} \frac{P_T \cdot G_T \cdot G_R \cdot \lambda^2 \cdot (\text{Tan}(\beta/2)^2}{4(4\pi R_i)^2 \cdot kT_0 \cdot F_n \cdot L} \cdot \tau_P \tag{6}$$

Figure 5:
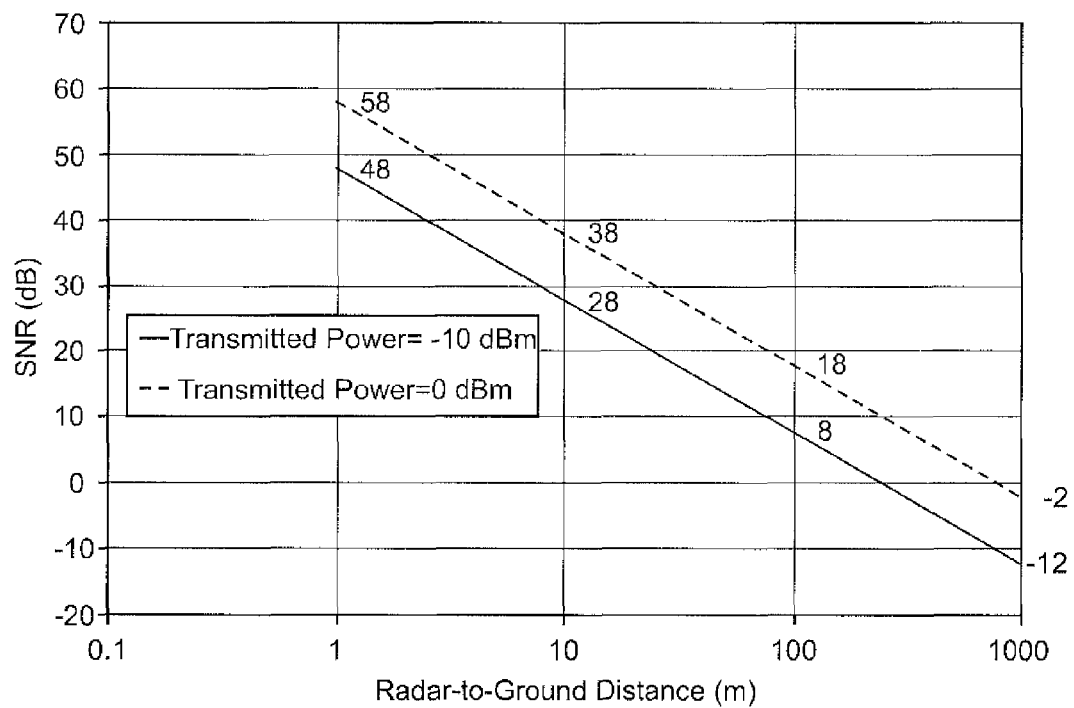
FIG. 5 is a graph illustrating signal to noise ratio (SNR) as a function of distance from the ground of a radar receiver, in accordance with an embodiment.

FIG. 5 is a graph illustrating signal to noise ratio (SNR) as a function of distance in air from the ground of a radar receiver, in accordance with an embodiment. FIG. 5 demonstrates the signal-to-noise ratio for two scenarios of 0 dBm (decibels normalized to milliwatts (m or mW)) and −10 dBm transmitted power, as indicated by the legends on FIG. 5. The antenna gain was measured to be 12 dBi (decibels relative to an isotropic antenna), center frequency of 5 GHz and bandwidth of 2 GHz, room temperature operation (generally taken as about 293 degrees Kelvin) with the receiver with 6 dB of noise factor and 8 dB of loss in its transmitter circuitry. Since the sUAS aircraft (see FIG. 6) may fly approximately 2-10 ft. above the ground, the majority of the attenuation may generally be from soil and reflected signals, depending on the composition of the soil or ground, and can be as large as 10-30 dB/ft., hence, the curves may shift down by 3 orders of magnitude in depth to a few feet at −10 dBm of transmitted power.

Figure 6:
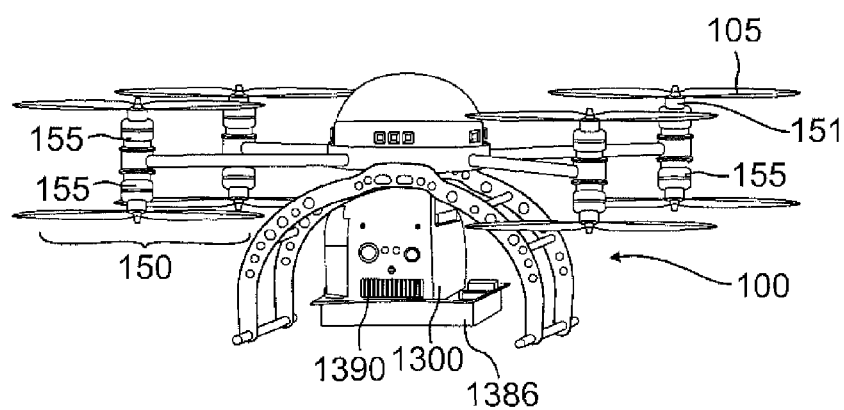
FIG. 6 is a perspective view illustrating a vertical take off and landing (VTOL) small unmanned aerial system (sUAS) carrying a radar sensor, in accordance with an embodiment.

FIG. 6 illustrates a vertical take off and landing (VTOL) small unmanned aerial system (sUAS) aircraft 100 carrying a radar sensor 1300, in accordance with an embodiment. Aircraft 100 may also include a payload delivery system 1386 for delivering a payload (e.g., an object or an electric discharge or spark) to, for example, a buried IED detected by UWB radar scanning (using radar sensor 1300) of a suspect area. Aircraft 100 may also include an explosive discoloration agent spray system 1390 for spraying an interrogated (e.g., scanned using radar sensor 1300 or optical camera or thermal imaging cameras 137, see FIG. 7A) portion of a suspect area with explosive discoloration agent to verify the presence of a buried IED. Aircraft 100 may also by augmented by attaching guards (not shown) around the propellers for safe and quiet surveys.

Aircraft 100 may include a VTOL capability as an sUAS with its radar sensor 1300 that may operate as an ultra-wideband (UWB) radio frequency (RF) radar that has the capability to perform autonomous take-off and landing. As a dual function radar that operates in the license free band of 3-6 GHz, the UWB RF sensor 1300 may also be used, for example, as a motion detector and tracking system for surveillance of live objects inside a compound. The UWB RF sensor 1300 may emit rapid wideband pulses (e.g., sub nanosecond pulse width) that can penetrate glass, wood, concrete, dry wall and bricks. In the receiver (e.g., receiver 1370), a detector circuit may be employed to identify the reflections 1303 of transmitted pulses 1301 (e.g., pulses 1356, 1366). The received periodic pulses may be manipulated to enhance SNR while maintaining very low transmission power. Advanced signal processing algorithms may be employed to construct the activity detection of the target (e.g., target 1305). By using a laptop or game module (e.g., display 163, 165) the remotely guided mini-UAV (e.g., aircraft 100) can use the radar capability to land in a stationary position and scan the compound for detection of live objects, e.g., animals or people. While in motion or in stationary detection mode, aircraft 100 may process the data it collects and display the activity level in real-time. Aircraft 100 may have the capability of being configured to scan in the horizontal as well as in the vertical axis and may be capable of performing remote surveillance of premises at extended standoffs from a remote operator of sUAS aircraft 100. The system can be used, for example, to map inside walls of a compound for constructing a 2-D image of the building.

FIG. 6 illustrates aircraft 100 in a hovering mode. A radar mode operation in real-time may transmits a surveillance signal remotely to a controlling station at an extended range away from sUAS aircraft 100. The reflected signal from its radar transmitter (e.g., transmitter 1302, 1350, or 1360) may be an indicator that has been calibrated to show the relative elevation to the ground in this figure.

Figure 7A:
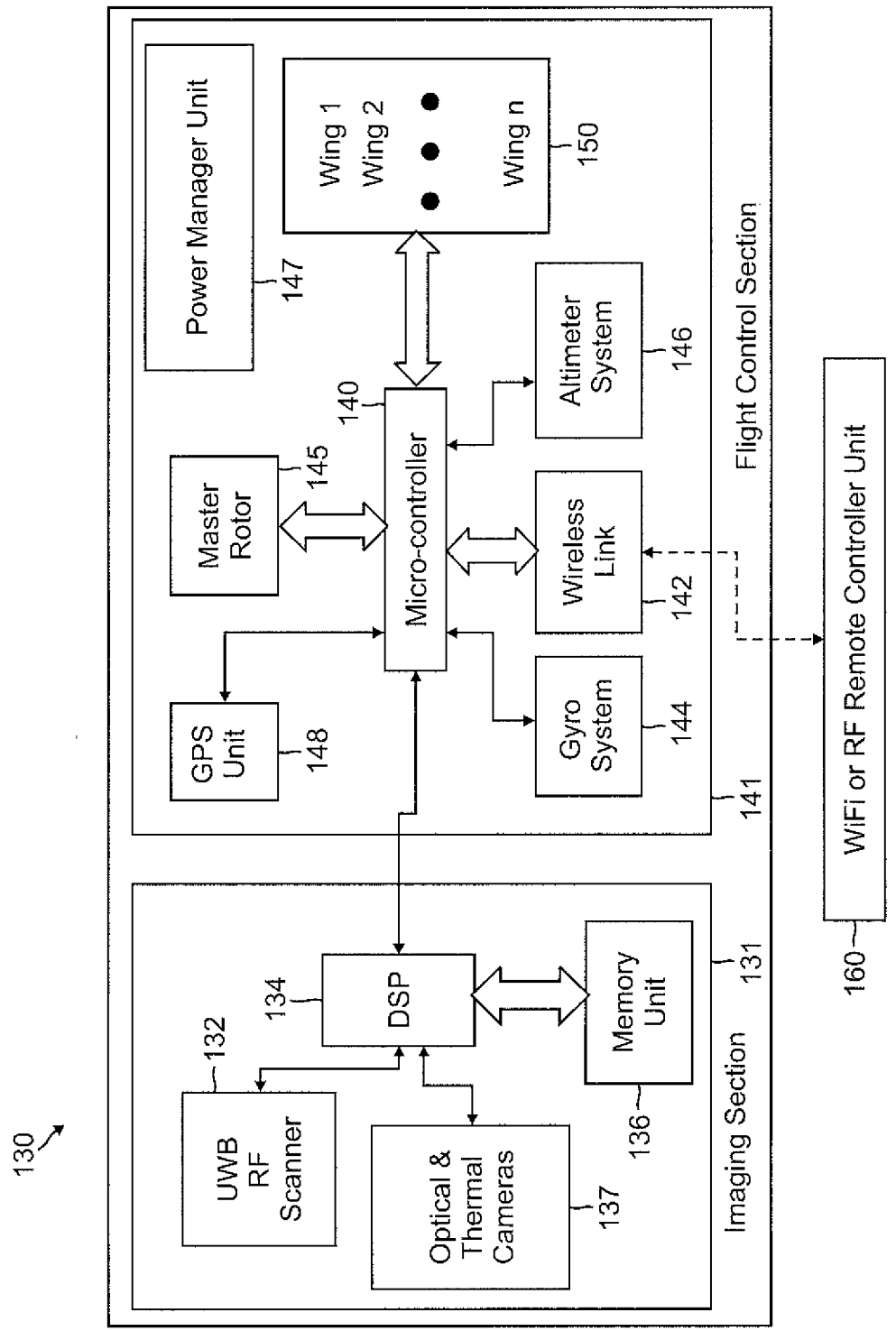
FIGS. 7A and 7B are system block diagrams illustrating a control and imaging system for an sUAS, such as shown in FIG. 6, in accordance with an embodiment.

The autonomous landing of the VTOL sUAS aircraft 100 in a pre-defined waypoint employs the capabilities provided by a GPS unit 148 (see FIG. 7A). The system aircraft 100 may fly to the pre-set GPS coordinates by using a combination of its GPS guidance system, a magnetometer for coarse guidance validation, and a gyro guidance system in cases that GPS information gets denied. Upon reaching the vicinity of the waypoint, the VTOL sUAS aircraft 100 may activate its UWB radar system 1300 and may zig-zag at a constant altitude around the suspect area (see FIG. 9).

Aircraft 100 may be remotely operated, for example, by a single specialist, such as Explosive Ordnance Disposal (EOD) personnel. Aircraft 100 may have a total diameter less than 30 inches (in.) and total flying weight, including batteries and UWB RF imager 1300 of less than 10.5 pounds (lb.). Aircraft 100 may have operational capability for vertical takeoff from any flat surface or surface sloped less than 45 degrees to a 100 ft. altitude in less than 10 seconds. Aircraft 100 may have operational capability for hover about 1.0 ft. above ground when locked to the GPS, e.g., using GPS unit 148. Aircraft 100 may have operational capability for sustained operation for at least 8.5 minutes, up to and possibly exceeding 30 minutes. Aircraft 100 may have operational capability for landing non-line-of-site (NLOS) using on-board radar capability.

As shown in FIG. 6, each wing propeller unit 155 of the plurality of wing propeller units 150 may include a wing unit propeller 105, a DC motor 151 and an ESC (not shown) for driving the motor. Each wing propeller unit 155 may include a local controller and a micro-electro mechanical (MEM) based gyro or accelerometer (not shown).

FIG. 7A illustrates one example of a system architecture for sensing, imaging, flight control, and telemetry system 130. Sensing, flight control, and telemetry system 130 may include an imaging section 131 and a flight control section 141, which may communicate wirelessly via a remote controller unit included in a control system 160. Wireless control system 160 may conform, for example, to any of the open standards or may be a proprietary control system. Wireless network connectivity may be provided by a wireless control system 160.

Imaging section 131 may include one or more UWB RF scanners (e.g., sensor array 132) such as, for example, the 5 GHz or 60 GHz systems referenced above. In addition, imaging section 131 includes an optical video camera 137. The UWB RF scanner (sensor array unit 132) and camera 137 may be connected to a digital signal processing (DSP) unit 134, which may access a memory unit 136 comprising, for example, a random access memory (RAM). The DSP unit 134 may communicate, as shown in FIG. 7A, with flight control section 141. The UWB RF scanners may scan the ground over a field of view that ranges from 20 to 150 degrees.

Flight control section 141 may include a micro-controller 140. Micro-controller 140 may integrate all sensory and control inputs from the components of flight control section 141 and may provide control and telemetry outputs for UAV 100. As shown in FIG. 7A, micro-controller 140 may receive inputs from wireless link 142, which may provide operator control inputs from an operator at a remote location using, for example, a WiFi or RF remote controller unit of wireless control system 160. Micro-controller 140 may receive additional control and stabilizing inputs, for example, from gyro system 144 and altimeter system 146. Micro-controller 140 may receive position or location data from GPS system 148. For example, inputs from GPS system 148 may enable UAV 100 to report its position via telemetry and to be monitored over Google® maps, for example, using GPS.

Micro-controller 140 may provide control outputs and receive feedback inputs from wing propeller units 150. As shown in FIG. 6, each wing propeller unit 155 of the plurality of wing propeller units 150 may include a wing unit propeller 105, a DC motor 151 and an ESC (not shown) for driving the motor. Each wing propeller unit 155 may include a local controller and a micro-electro mechanical (MEM) based gyro or accelerometer (not shown).

Flight control section 141 may also include a power manager unit 147 for providing and regulating electrical power to any of the systems of UAV 100.

Figure 7B:
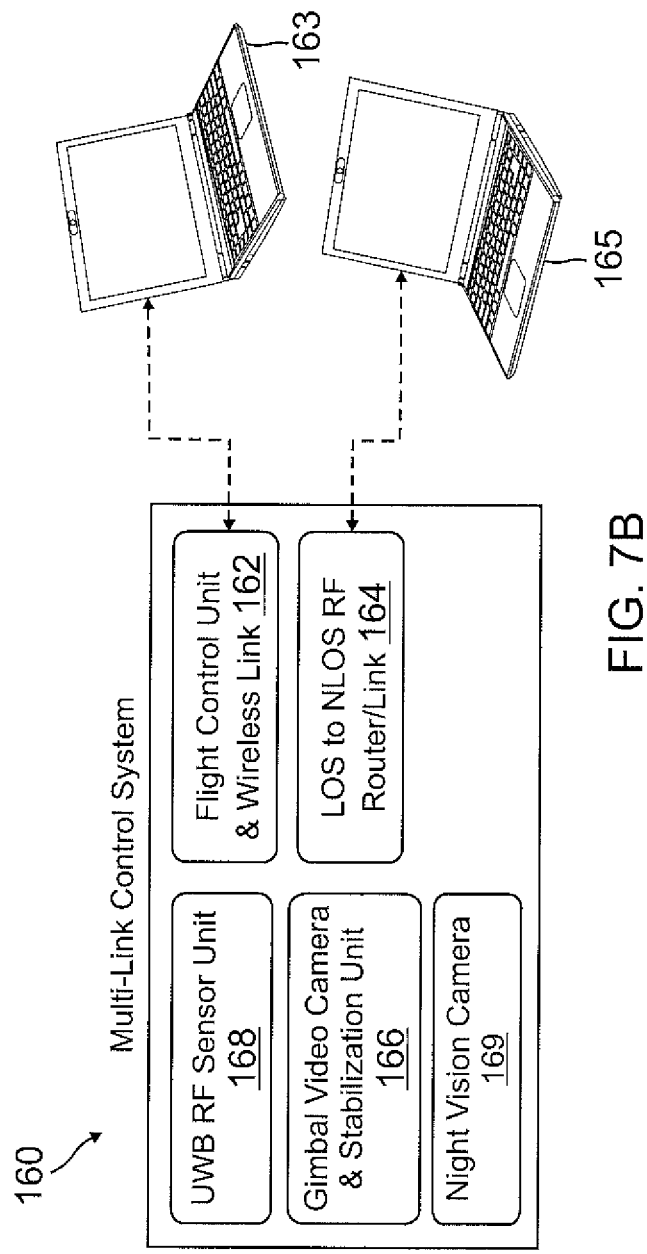

FIG. 7B illustrates one example of a multi-link wireless control system 160 for standoff surveillance system 100. Multi-link wireless control system 160 may include a system interface display (see FIGS. 10A, 10B) for providing surveillance information to a user from an RF imaging system or other surveillance systems (e.g., video, audio) on UAV 100. Control system 160 may provide a system interface for one or more operators using display and input devices to communicate with and control UAV 100 at a location remote from UAV 100. The remote controller may be, for example, a laptop or hand-held system, or a device that provides joy stick controls, for example, for the rate of rotation for each of propellers 105. For example, flight control may be provided by adjustment of the speed and thrust from all of the propeller units concurrently under direction of micro-controller 140, which may interpret signals from the joysticks to co-ordinate the adjustments.

Multi-link wireless control system 160 may provide links, as shown, for a UWB radar RF sensor unit 168, gimbal video camera and stabilization unit 166, night vision camera 169, flight control unit 162, and line-of-sight (LOS) to non-line-of-sight (NLOS) router link 164. Each of these units may, for example, process telemetry data or interface control inputs to a corresponding unit on UAV 100. Interface display 163, for example, may provide first person view (FPV) control and direct visual flight control for UAV 100 as well as display telemetry data such as RF imaging from the UWB radar sensors on board the UAV 100. Interface display 165 may provide an LOS to NLOS router link for UAV 100.

Figures 8A, 8B:
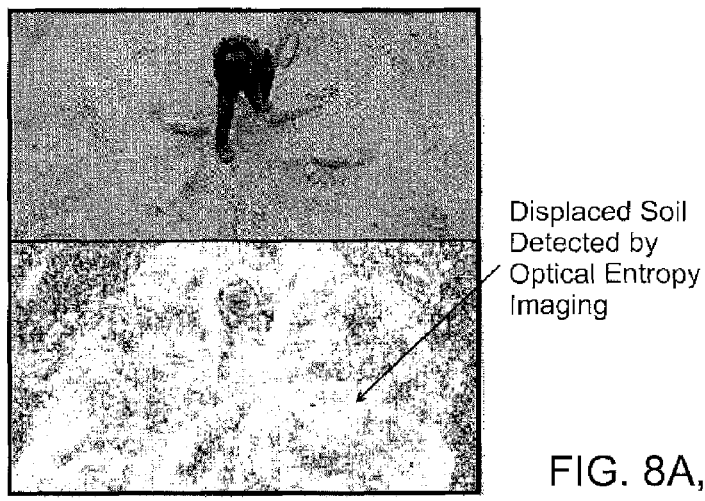
FIGS. 8A and 8B are side by side images, for comparison, of an area depicted using optical imaging (FIG. 8A) and the same area depicted using optical entropy imaging (FIG. 8B), in accordance with an embodiment.

FIGS. 8A and 8B are side by side images, for comparison, of an area depicted using optical imaging (FIG. 8A) and the same area depicted using optical entropy (also referred to as texture filtering) imaging (FIG. 8B), in accordance with an embodiment.

Integrated RF and optical sensors in aircraft 100 may enable a multi-stage mode of operation. In an initial optical stage, the flying aircraft 100 may image the ground surface using its optical camera (e.g., camera 137). The resulting video image may be analyzed within system 160 for the presence of disturbed ground as would be characteristic of a buried IED. For example, edge detection and high pass image processing algorithms may be used to detect the presence of disturbed ground within the resulting video image. In a subsequent mode of operation, aircraft 100 may interrogate the identified disturbed ground patches with UWB radar sensor 1300 to confirm or deny the presence of a buried IED beneath the disturbed ground surface. Aircraft 100 may include an integrated infrared camera in addition to or in place of optical camera 137. The video analysis for disturbed ground may thus be conducted in both the visual and infrared spectra.

FIGS. 8A and 8B show the difference between disturbed ground surface such as from the burying of an IED and undisturbed ground surface. A disturbed surface may be detected using an optical image processing filter such as entropy processing filter (also referred to as texture filtering) as shown in FIG. 8B. The disturbed ground surface has a relatively high texture (or entropy) as compared to the low texture for the undisturbed ground surface.

Thermal imaging and chemical detection modules (e.g., optical or thermal imaging cameras 137 and explosive discoloration agent spray system 1390) may be implemented by integration of a high resolution thermal imaging camera and a parts-per-billion (ppb) sensitivity nitrogen and plastic explosive detection sniffer or chemical discoloration spray that can be used for in-situ verification of explosive upon preliminary detection of a hidden object using optical or UWB radar detection. A communication link between an EOD specialist and the sUAS may be based on WiFi, 4G, or other proprietary protocol. The processed 3-D underground images may then be shown on a display such as displays 163, 165.

Figure 9:
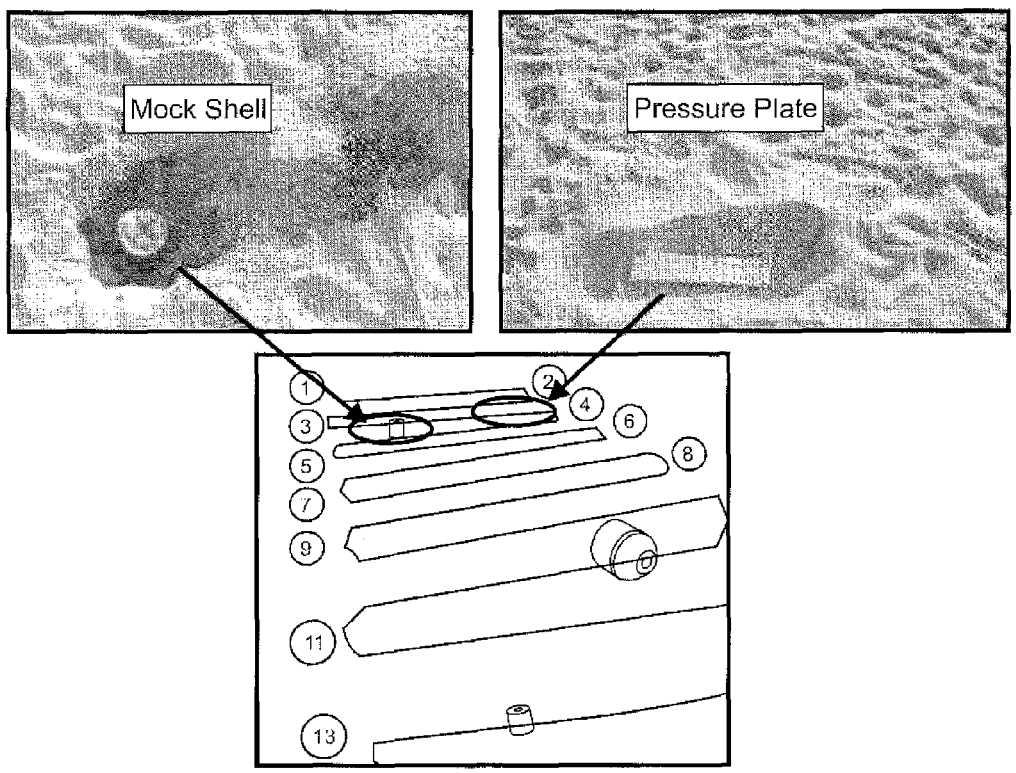
FIG. 9 is a perspective view, with expanded insets showing hidden objects and the locations where they are buried, of a search pattern conducted by an sUAS, such as shown in FIG. 6, in accordance with an embodiment.

FIG. 9 is a perspective view, with expanded insets showing hidden objects, a mock explosive shell and mock pressure plate and the locations where they are buried, subjected to a search pattern conducted by an sUAS aircraft 100. An autonomous scan of the soil of a suspect area, using a zig-zag pattern as shown in FIG. 9 may be implemented automatically using aircraft 100 with DGPS accuracy and synchronization of scanned rows (to eliminate the smear effect produced by overlapping rows). The autonomous scan may robustly provide a three-dimensional (3-D) spatial image of the detected target. Guiding of the search pattern may employ incremental GPS waypoints provided by GPS system 148.

Figure 10A:
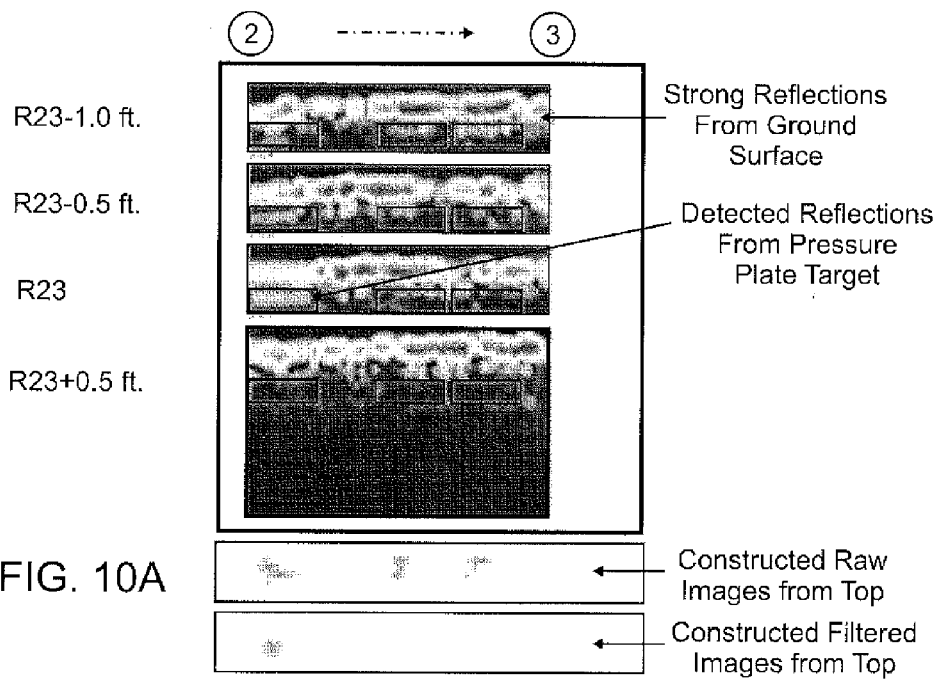
FIGS. 10A and 10B are display images showing sensor images from the search pattern illustrated in FIG. 9, in accordance with an embodiment.
Figure 10B:
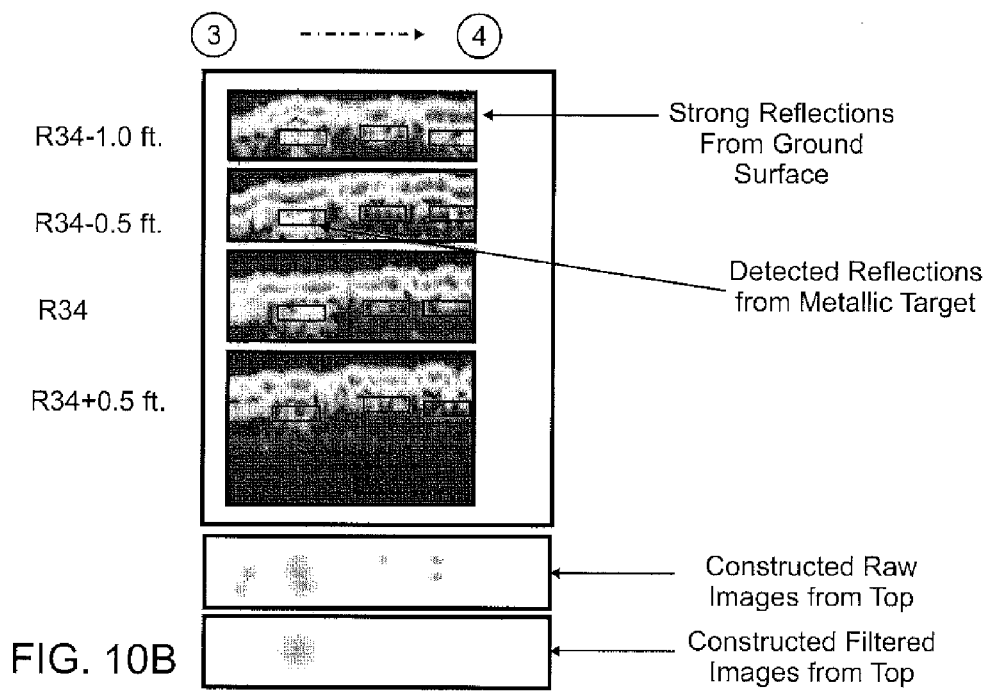

FIGS. 10A and 10B are display images showing sensor images from the search pattern illustrated in FIG. 9, in accordance with an embodiment. The display images may be provided, for example, on displays 163, 165 using a telemetry system (e.g., multi-link control system 160). FIG. 10A shows an image display for a scan of a row of the zig-zag pattern shown in FIG. 9, in particular the row from incremental waypoint(2) marked in FIG. 9 to incremental waypoint(3) marked in FIG. 9, referred to as R23 in FIG. 10A. Similarly, FIG. 10B shows an image display for a scan of the row from waypoint(3) to waypoint(4) marked in FIG. 9, referred to as R34 in FIG. 10B. FIGS. 10A and 10B demonstrate RF scanned image fusion for providing a hidden object's 3-D image using sensor image processing. Images may be generated by the scan of each row (e.g., R23 and R34) from 3.5 ft. above ground, for example, and fused together using signal filtering, which may be implemented in software, hardware, or a combination of both.

Figure 11A:
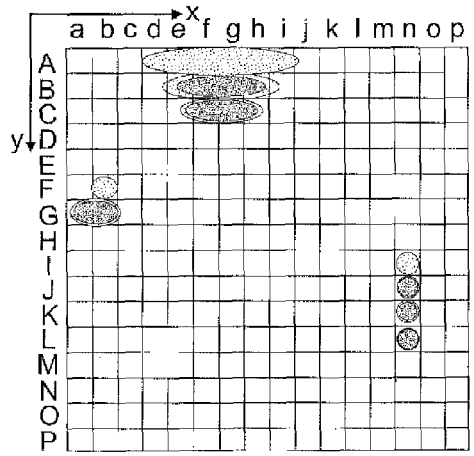
FIGS. 11A and 11B are x-y coordinate grids and FIGS. 11C and 11D are, respectively, x-z and y-z coordinate grids illustrating an example of signal processing for a search pattern such as shown in FIG. 9, in accordance with an embodiment.
Figure 11B:
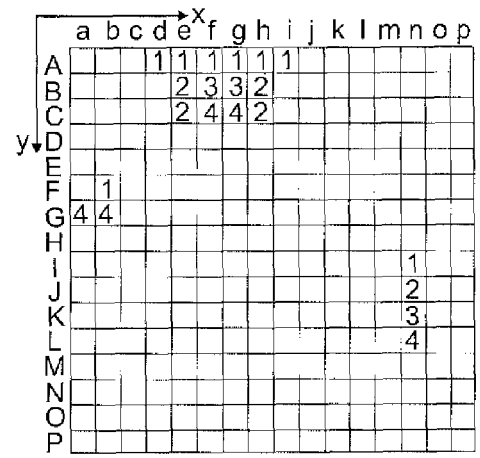
Figure 11C:
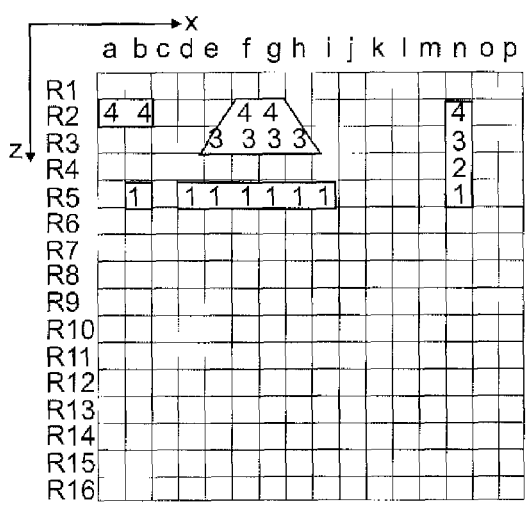
Figure 11D:
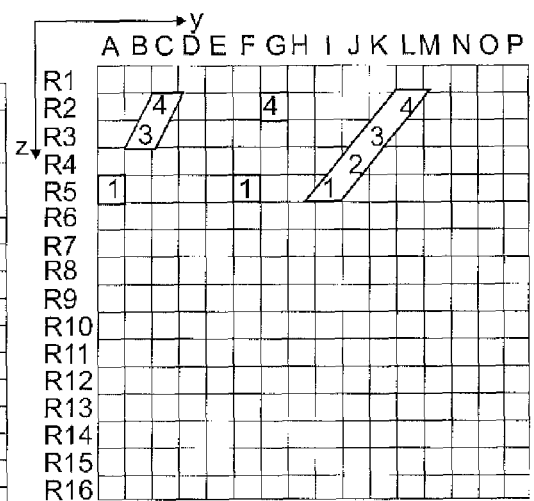

FIGS. 11A and 11B are x-y coordinate grids (e.g., horizontal plane) and FIGS. 11C and 11D are, respectively, x-z and y-z coordinate grids (e.g., vertical planes) illustrating an example of signal processing for a search pattern such as shown in FIG. 9, in accordance with an embodiment. FIG. 11A demonstrates an example of signal processing for the search pattern described in FIG. 9, in which the images for the zig-zag scans may stitched together using synchronization and scan direction adjustments to align the images with the grid locations. FIG. 11A may show, for example, reflected power level or depth information, with gray scale indicating unquantized values for each grid location. Synchronization and scan direction adjustments may be addressed, for example, by using universal time stamp and a triangulation algorithm, in addition to GPS as standalone GPS may not provide fine enough spatial increment resolution.

As an illustration of IED identification, a system of quantization is used. For simplicity of the illustration, the example presented in FIGS. 11A-11D describes a four-stage quantization (e.g., values shown in the grid locations in FIGS. 11B-11D range from 1-4) based on the reflected power from objects underground. Background elimination may be performed for the entire scanned area (shown in FIG. 9) by initializing the background elimination at the beginning of each row's scan.

A complementary pattern also exists from the radar data that demonstrates the depth for each value on the x-y grid (e.g., horizontal plane) so that depth information can be coordinated to the x-z and y-z coordinate grids (e.g., vertical planes). The quantized signal at each x-y grid location may then be paired with the depth information from radar to provide the quantized value location on the x-z and y-z coordinate grids as shown in FIGS. 11C and 11D.

Figure 12:
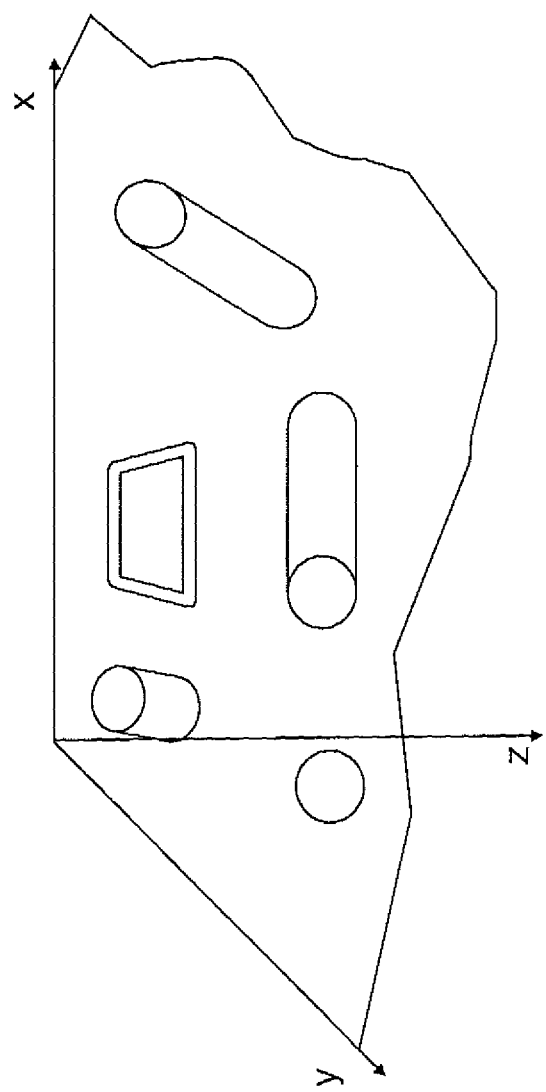
FIG. 12 is an x-y-z coordinate system illustrating an example of signal processing for a search pattern such as shown in FIG. 9, in accordance with an embodiment.

FIG. 12 is an x-y-z coordinate system illustrating the example of FIGS. 11A-11D of signal processing for the search pattern shown in FIG. 9. FIG. 12 presents a 3-D image of the detected objects scanned by the UWB radar imaging system that is integrated with the VTOL sUAS aircraft 100 using the search pattern of FIG. 9 and detection and imaging illustrated by FIGS. 10 and 11.

Figures 13A, 13B, 13C:
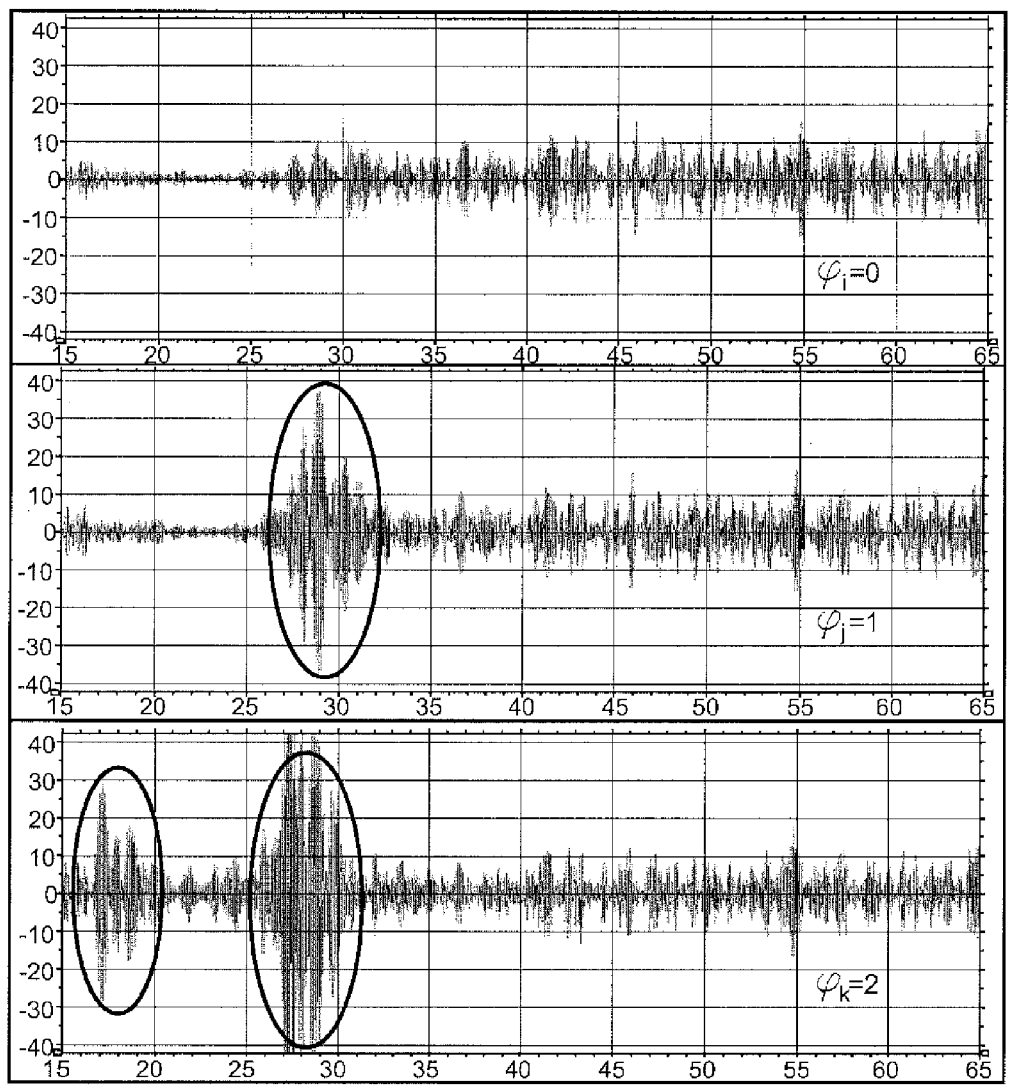
FIGS. 13A, 13B, and 13C are a set of three graphs illustrating examples of reflected power patterns for signal processing for a search pattern, in accordance with an embodiment.

FIGS. 13A, 13B, and 13C are a set of three graphs illustrating examples of reflected power patterns for signal processing for a search pattern, in accordance with an embodiment.

The coordinates and timing of each incremental waypoint may already be programmed in the VTOL sUAS aircraft 100 prior to launch. Travelling at constant altitude through each waypoint (j), the UWB radar (e.g., radar sensor 1300, UWB RF scanner 132) may scan the reflected power (Pj) pattern at the radar's receiver (e.g., radar receiver 1304, 1370). The reflected power (Pj) pattern may be stored in what is referred to as a "bin" file. FIGS. 13A, 13B, and 13C depict samples of reflected patterns obtained from the UWB radar sensor 1300.

While the content of the reflected power ($\psi(Pj)$) is stored in a bin file, a mathematical filtering may be performed to identify spatial position ($\phi(Pj)$) of the reflections. The filtering function $\phi(Pj)$ may identifies the number of reflected elements within the beam width range of the UWB's antenna system. So, for example, as shown in FIG. 13A, zero reflected elements are identified and $\phi_j = \phi(Pi) = 0$. As shown in FIG. 13B, $\phi(Pj)$ or $\phi_j = 1$, identifying one reflected element, and in FIG. 13C, $\phi_k = 2$, identifying two reflected elements. The data is then processed by the UWB radar imaging process illustrated in FIG. 9 through FIG. 12 and FIG. 13 to depict the 3-D image of the detected objects underground as shown in FIG. 12.

Figure 14:
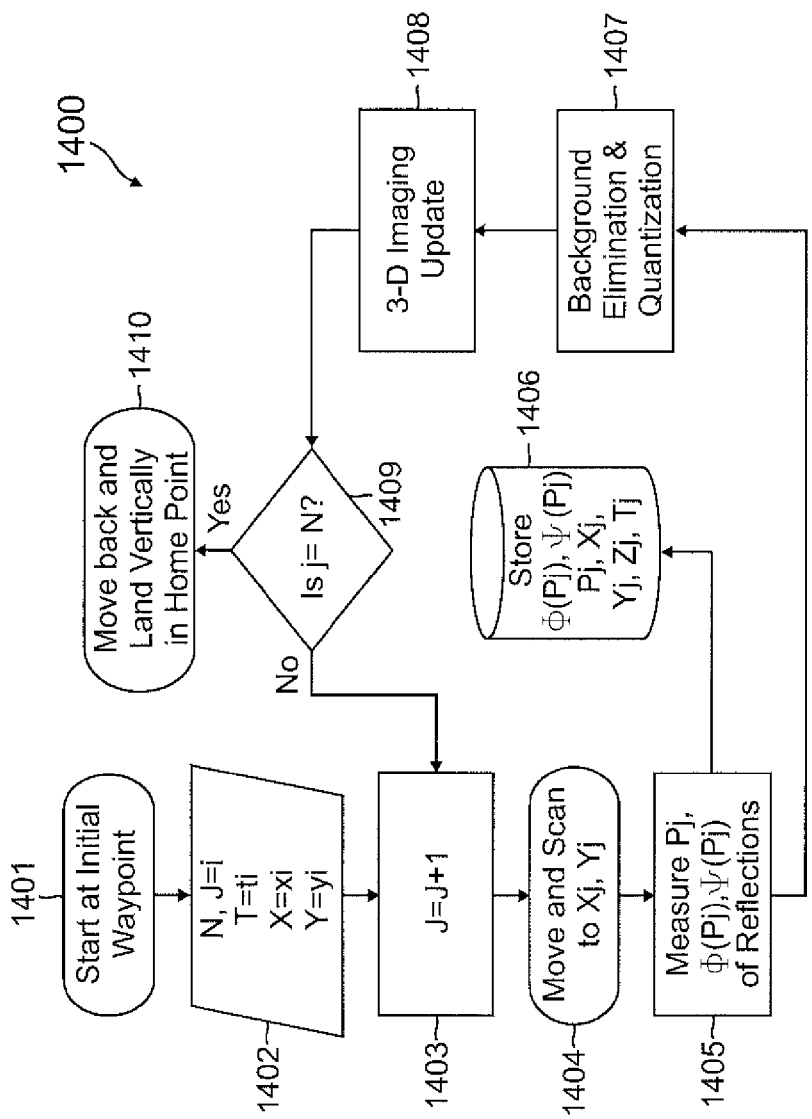
FIG. 14 is a flow chart illustrating a method for signal processing for a search pattern, in accordance with an embodiment.

FIG. 14 is a flow chart illustrating a method 1400 for signal processing for a search pattern, as illustrated by FIGS. 9-13. At step 1401, method 1400 may fly aircraft 100 to an initial incremental waypoint such as waypoint(1) shown in FIG. 9.

Aircraft 100 may fly autonomously, for example, to the initial pre-programmed waypoint or may fly under the direction of a remote operator using multi-link control system 160.

At step 1402, various variables may be initialized, such as N, the number of incremental waypoints in the search pattern; J, the current value of the waypoint index i; T, the time (e.g., universal time stamp) that waypoint(i) is scanned; X, Y, x-y coordinates of waypoint(i). At step 1403, J, the current value of the waypoint index may be incremented so that aircraft 100 may proceed to scan along a row of the search pattern of FIG. 9 to the next incremental waypoint (step 1404). At step 1405, The UWB radar imaging system (e.g., imaging section 131) may identify spatial position ($\phi(Pj)$) and measure reflected power ($\psi(Pj)$) for Pj and may store ($\phi(Pj)$), ($\psi(Pj)$), Pj, Xj, Yj, Zj, and Tj in a bin file (step 1406). At step 1407, the imaging system may perform background elimination and quantization, as described above with reference to FIGS. 9-13. At step 1408, a 3-D imaging update may be performed, for example, to update an image such as that shown in FIG. 12 on a display device such as display 163, 165 for viewing by a remote operator. At step 1409, a check may be performed to determine whether the entire search pattern has been scanned. If not, method 1400 may return to step 1403 for scanning the next row of the search pattern; and if so, method 1400 may proceed to step 1410 for returning "home" or proceeding on to the next mission. As with step 1401, in step 1410 aircraft 100 may fly autonomously, for example, to a pre-programmed home waypoint or may fly under the direction of a remote operator using multi-link control system 160 home or on to the next mission.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system for detecting the presence of buried objects, comprising:
    an aircraft having a plurality of wing unit propellers for vertical takeoff and landing;
    a control system included in the aircraft for controlling flight of the aircraft autonomously at an altitude of approximately 2 to 10 feet above a ground surface and for receiving additional control inputs from an operator at a remote location;
    an ultra-wideband (UWB) radar imaging system, wherein the UWB radar imaging system is carried by the aircraft; and
    a telemetry system carried by the aircraft for providing information from the UWB radar imaging system to the remote location, wherein
        the control system is configured to perform an autonomous scan of a suspect area by autonomously flying the aircraft in a search pattern over the suspect area and interrogating the suspect area with the UWB radar imaging system, wherein the autonomous scan further comprises:
            coordinates and tinting of a plurality of incremental waypoints that are programmed in the system prior to flight of the aircraft;
            a reflected power, Pj, for each incremental waypoint (j) scanned by the UWB radar imaging system as the aircraft travels at constant altitude through each incremental waypoint(j);
            a pattern of reflected power from a plurality of Pj stored in a bin ($\psi(Pj)$); and
            a number of reflected elements within a beam width antenna range of the UWB radar imaging system determined by a mathematical filtering of the bin ($\phi(Pj)$) performed to identify a spatial position ($\psi(Pj)$) of the reflected elements;
        the UWB radar imaging system performs, at each location of an x-y grid of the search pattern, a quantization based on reflected power from the UWB radar interrogation provide one or more quantized values for each location of the x-y grid; and
        the UWB radar imaging system pairs each of the one or more quantized values at each x-y grid location with depth information from the UWB radar interrogation coordinated to x-z and y-z coordinate grids corresponding to the x-y grid to form a three-dimensional image from the quantized values with resolution as small as or smaller than 0.5 ft., including an identification of the number of reflected elements, at each x-y grid location, of one or more buried objects.

2. The system of claim 1, further comprising:
    a global positioning system (GPS) unit carried by the aircraft; and wherein
    the system determines a start point for autonomously flying the search pattern from a global positioning system (GPS) waypoint.

3. The system of claim 1, further comprising:
    a global positioning system (GPS) unit carried by the aircraft; and wherein
    the control system determines one or more incremental waypoints for autonomously flying the search pattern of the autonomous scan in a zig-zag pattern implemented automatically using differential GPS; and
    the imaging system performs a synchronization of scanned rows to align images from the autonomous scan.

4. The system of claim 1, wherein the autonomous scan further comprises:
    pairing a quantized reflected power data with depth information data from the UWB radar interrogation for each location of a grid of the search pattern; and
    forming a three-dimensional image of buried objects in the grid from the paired data.

5. The system of claim 1, further comprising:
    an optical or infrared camera carried by the aircraft, wherein:
        the telemetry system provides information from the optical or infrared camera to the remote location; and
        the system is configured to
            initially interrogate a ground surface with the optical or infrared camera using an entropy filter processing to locate a disturbed ground surface; and
            subsequently interrogate the disturbed ground surface with the UWB radar imaging system for detecting the presence of an improvised explosive device (TED) buried below the disturbed ground surface.

6. The system of claim 1, wherein the ultra-wideband (UWB) radar imaging system includes a wafer scale beam forming antenna array wherein the maximum dimension of the antenna array is less than 5 inches.

7. The system of claim 1, further comprising:
    an explosive discoloration agent spray system to spray an interrogated portion of a suspect area with explosive discoloration agent to verify the presence of a buried TED.

8. The system of claim 1, wherein:
the control system is a multi-link control system;
the multi-link control system includes a communication link for streaming optical, thermal, or radar processed images from a scanned portion of the suspect area.

9. The system of claim 1, wherein the aircraft includes a payload delivery system for delivering a payload to a scanned portion of the suspect area.

10. A method for detecting the presence of buried objects, comprising:
controlling, autonomously and additionally by receiving control inputs from an operator at a remote location, an aircraft having a plurality of wing unit propellers for vertical takeoff and landing;
operating an ultra-wideband (UWB) radar imaging system, wherein the UWB radar imaging system is carried by the aircraft; and
providing information from the UWB radar imaging system to the remote location, using a telemetry system carried by the aircraft; and
performing an autonomous scan, by the aircraft, of a suspect area by autonomously flying the aircraft in a search pattern, at an altitude of approximately 2 to 10 feet above a ground surface, over the suspect area and interrogating the suspect area with the UWB radar imaging system, further comprising:
programming coordinates and timing of a plurality of incremental waypoints in the system prior to flight of the aircraft;
scanning by the UWB radar imaging system as the aircraft travels at constant altitude through each incremental waypoint(j) a reflected power, Pj, for each incremental waypoint(j);
storing a pattern of reflected power from a plurality of Pj in a bin ($\psi(Pj)$); and
determining a number of reflected elements within a beam width antenna range of the UWB radar imaging system by a mathematical filtering of the bin ($\psi(Pj)$) performed to identify a spatial position ($\phi(Pj)$) of the reflected elements;
performing, at each location of an x-y grid of the search pattern, a quantization based on reflected power from the UWB radar interrogation with resolution as small as or smaller than 0.5 ft. to provide one or more quantized values for each location of the x-y grid; and
pairing each of the one or more quantized values at each x-y grid location with depth information from the UWB radar interrogation coordinated to x-z and y-z coordinate grids corresponding to the x-y grid to form a three-dimensional image from the quantized values, including an identification of the number of reflected elements at each x-y grid location, for detecting one or more buried objects.

11. The method of claim 10, further comprising:
determining a start point for autonomously flying the search pattern from a global positioning system (GPS) waypoint, wherein a GPS unit carried by the aircraft is used for determining the aircraft position.

12. The method of claim 10, wherein performing the autonomous scan further comprises:
flying the search pattern of the autonomous scan in a zig-zag pattern implemented automatically using differential GPS, wherein a GPS unit carried by the aircraft is used for determining the aircraft position; and
performing synchronization adjustments to align images from overlapping scanned rows of the search pattern.

13. The method of claim 10, further comprising:
pairing a quantized reflected power data with depth information data from the UWB radar interrogation for each location of a grid of the search pattern; and
forming a three-dimensional image of buried objects in the grid from the paired data.

14. The method of claim 10, further comprising:
providing information from an optical or infrared camera carried by the aircraft to the remote location using the telemetry system; and
initially interrogating a ground surface with the optical or infrared camera using an entropy filter process to locate a disturbed ground surface; and
subsequently interrogating the disturbed ground surface with the UWB radar imaging system for detecting the presence of an improvised explosive device (IED) buried below the disturbed ground surface.

15. The method of claim 10, further comprising:
forming a UWB radar beam, by the UWB radar imaging system, using a wafer scale beam forming antenna array wherein the maximum dimension of the antenna array is less than 5 inches.

16. The method of claim 10, further comprising:
spraying an explosive discoloration agent on an interrogated portion of a suspect area to verify the presence of a buried IED.

17. The method of claim 10, further comprising:
streaming optical, thermal, or radar processed images from a scanned portion of the suspect area using a communication link of a multi-link control system between the aircraft and the remote location.

18. The method of claim 10, further comprising delivering a payload to a scanned portion of the suspect area where the UWB imaging system has detected the presence of a buried object.

* * * * *

UNITED STATES PATENT AND TRADEMARK OFFICE
CERTIFICATE OF CORRECTION

PATENT NO. : 9,329,001 B2
APPLICATION NO. : 13/656382
DATED : May 3, 2016
INVENTOR(S) : Farrokh Mohamadi Page 1 of 1

It is certified that error appears in the above-identified patent and that said Letters Patent is hereby corrected as shown below:

On the Title Page: Item (71) Applicant:

The Applicant section should read:

Farrokh Mohamadi, Irvine, CA (US)

On the Title Page: Item (72) Inventor:

The Inventor section should read:

Farrokh Mohamadi, Irvine, CA (US)

In the Claims

In Column 11, Line 59, change "tinting" to --timing--.

In Column 12, Line 57, change "(TED)" to --(IED)--.

In Column 12, Line 67, change "TED" to --IED--.

In Column 14, Line 74, change "TED" to --IED--.

Signed and Sealed this
Fifth Day of July, 2016

Michelle K. Lee
*Director of the United States Patent and Trademark Office*